US012518343B2

(12) United States Patent
Kim et al.

(10) Patent No.: US 12,518,343 B2
(45) Date of Patent: Jan. 6, 2026

(54) ELECTRONIC DEVICE FOR IMAGE GENERATION, AND OPERATING METHOD OF ELECTRONIC DEVICE

(71) Applicant: Samsung Electronics Co., Ltd., Suwon-si (KR)

(72) Inventors: Junghyun Kim, Suwon-si (KR); Jeongmin Kim, Suwon-si (KR); Junsun Park, Suwon-si (KR); Jonghoon Lee, Suwon-si (KR); Ananya Mukherjee, Mountain View, CA (US); Tammy Yuen Yee Chow, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 309 days.

(21) Appl. No.: 18/461,123

(22) Filed: Sep. 5, 2023

(65) Prior Publication Data
US 2023/0410253 A1 Dec. 21, 2023

Related U.S. Application Data

(63) Continuation of application No. PCT/KR2022/003069, filed on Mar. 4, 2022.
(Continued)

(30) Foreign Application Priority Data

Apr. 1, 2021 (KR) .................. 10-2021-0042841

(51) Int. Cl.
G06T 3/40 (2024.01)
G06T 3/4038 (2024.01)
(Continued)

(52) U.S. Cl.
CPC ......... *G06T 3/4038* (2013.01); *H04N 23/695* (2023.01); *H04N 23/698* (2023.01); *G06K 15/189* (2013.01); *G06T 2207/20212* (2013.01)

(58) Field of Classification Search
None
See application file for complete search history.

(56) References Cited

U.S. PATENT DOCUMENTS 9,094,615 B2 * 7/2015 Aman .................... G06Q 30/02
9,357,117 B2 5/2016 Woo et al.
(Continued)

FOREIGN PATENT DOCUMENTS

CN 103716537 A 4/2014
JP H1127577 A 1/1999
(Continued)

OTHER PUBLICATIONS

International Search Report for PCT/KR2022/003069 mailed Jun. 23, 2022, 5 pages.
(Continued)

*Primary Examiner* — Haris Sabah
(74) *Attorney, Agent, or Firm* — Nixon & Vanderhye, P.C.

(57) ABSTRACT

An electronic device according to the present disclosure comprises: a camera having a first field of view; and at least one processor operatively connected to the camera, wherein the at least one processor can be configured to: acquire a first background image having a second field of view that is larger than the first field of view by allowing photography to be performed while changing the direction in which the camera faces, acquire, using the camera, a second background image corresponding to the first field of view and a subject positioned within the second background image, generate a composite image by combining a first part of the
(Continued)

first background image and a second part of the second background image on the basis of the distance between a designated position of the second background image and the subject, and generate an image including the composite image and the subject.

20 Claims, 12 Drawing Sheets

Related U.S. Application Data

(60) Provisional application No. 63/157,223, filed on Mar. 5, 2021.

(51) Int. Cl.
  *H04N 23/695* (2023.01)
  *H04N 23/698* (2023.01)
  *G06K 15/02* (2006.01)

(56) References Cited

U.S. PATENT DOCUMENTS

| | | | |
|---|---|---|---|
| 2002/0122605 A1 | 9/2002 | Chang | |
| 2013/0088592 A1* | 4/2013 | Falomkin | G06F 16/74 |
| | | | 348/143 |
| 2014/0306999 A1 | 10/2014 | Yim et al. | |
| 2014/0320668 A1* | 10/2014 | Kalevo | H04N 23/69 |
| | | | 348/169 |
| 2015/0062283 A1* | 3/2015 | Mintz | H04N 7/141 |
| | | | 348/14.07 |
| 2016/0292842 A1* | 10/2016 | Pylkkanen | H04N 13/239 |
| 2017/0237898 A1 | 8/2017 | Lee et al. | |

FOREIGN PATENT DOCUMENTS

| | | | |
|---|---|---|---|
| JP | 2003259214 | A | 9/2003 |
| JP | 2004128588 | A | 4/2004 |
| JP | 3983623 | B2 | 7/2007 |
| JP | 2012208756 | A | 10/2012 |
| JP | 2014068081 | A | 4/2014 |
| JP | 5602818 | B2 | 8/2014 |
| JP | 2014168147 | A | 9/2014 |
| JP | 2017192106 | A | 10/2017 |
| JP | 6261205 | B2 | 12/2017 |
| JP | 6411991 | B2 | 10/2018 |
| JP | 2020043419 | A | 3/2020 |
| KR | 20020060495 | A | 7/2002 |
| KR | 20140122952 | A | 10/2014 |
| KR | 20180091225 | A | 8/2018 |
| KR | 101905580 | B1 | 10/2018 |

OTHER PUBLICATIONS

Written Opinion of the ISA for PCT/KR2022/003069 mailed Jun. 23, 2022, 5 pages.
Korean Office Action issued Apr. 30, 2025 in corresponding Korean Patent Application No. 10-2021-0042841.

* cited by examiner

ELECTRONIC DEVICE FOR IMAGE GENERATION, AND OPERATING METHOD OF ELECTRONIC DEVICE

CROSS-REFERENCE TO RELATED APPLICATIONS

This application is a continuation of International Application No. PCT/KR2022/003069 designating the United States, filed on Mar. 4, 2022, in the Korean Intellectual Property Receiving Office and claiming priority to U.S. Provisional Patent Application No. 63/157,223, filed on Mar. 5, 2021, in the U.S. Patent and Trademark Office, and to Korean Patent Application No. 10-2021-0042841, filed on Apr. 1, 2021, in the Korean Intellectual Property Office, the disclosures of each of which are incorporated by reference herein in their entireties.

BACKGROUND

Field

The disclosure relates to an electronic device for image generation and an operation method of the same.

Description of Related Art

With the development of wireless communication technologies, live streaming, which provides content consumers with a live video captured in real time via a camera provided in a wireless communication device, such as a smartphone or a tablet, through the Internet, is becoming common. In particular, there is an increasing trend of one-person media in which individuals directly produce and share various contents.

SUMMARY

Embodiments of the disclosure provide an electronic device for performing control so that a subject photographed by a camera included in the electronic device is located at the center of a display, and an operation method thereof.

Embodiments of the disclosure provide an electronic device for synthesizing a pre-captured image and a live video, and an operation method thereof.

Embodiments of the disclosure provide an electronic device for providing background synthesis without sense of discomfort in consideration of a moving speed of a subject, and an operation method thereof.

An electronic device according to an example embodiment of the disclosure may include: a camera having a first field of view, and at least one processor operably connected to the camera, wherein the at least one processor is configured to: acquire a first background image having a second field of view greater than the first field of view by capturing image capturing while changing a direction toward which the camera faces, acquire, using the camera, a second background image corresponding to the first field of view and a subject located within the second background image, generate a synthesized image by synthesizing a first part of the first background image and a second part of the second background image, based on a distance between the subject and a designated position in the second background image, and generate a video including the synthesized image and the subject.

A method of operating an electronic device according to an example embodiment of the disclosure may include: acquiring a first background image having a second field of view greater than a first field of view by image capturing while changing a direction toward which a camera faces, acquiring a second background image corresponding to the first field of view and a subject located within the second background image, generating a synthesized image by synthesizing a first part of the first background image and a second part of the second background image, based on a distance between the subject and a designated position in the second background image, and generating a video including the synthesized image and the subject.

An electronic device according to an example embodiment can provide a content in which a user is located at the center in a video, via a relatively small amount of computation. Through this, an increase in the degree of immersion in the content can be provided to a viewer watching a live video.

An electronic device according to an example embodiment enables a producer to broadcast a high-quality video with minimal equipment.

The effects obtainable in the disclosure are not limited to the above-mentioned effects, and other effects that are not mentioned may be clearly understood by those skilled in the art to which the disclosure belongs, from the descriptions below.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described in greater detail with reference to the accompanying drawings. However, this is not intended to limit the disclosure to a specific form and should be understood to include various modifications, equivalents, and/or alternatives of embodiments of the disclosure.

Figure 1:
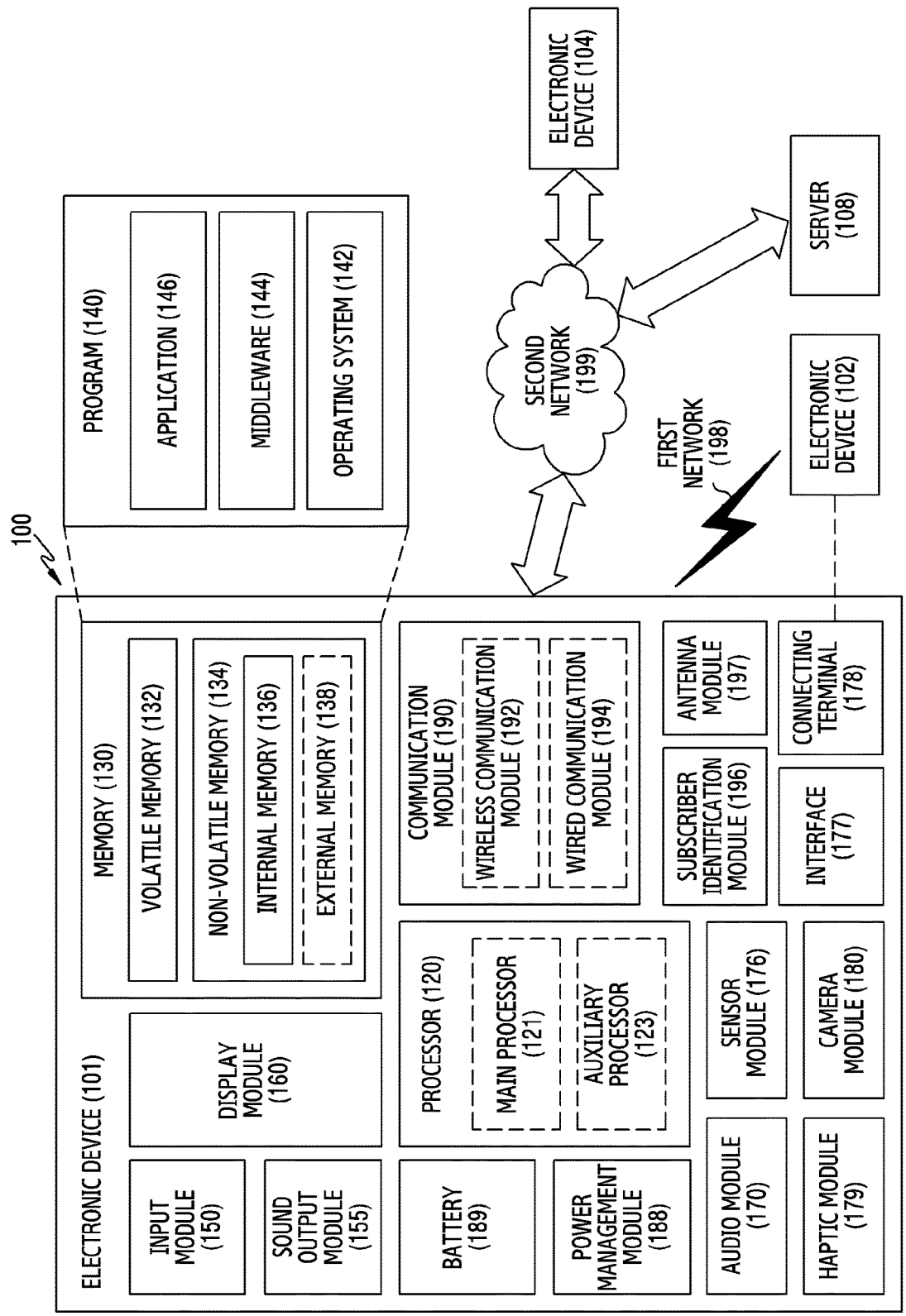
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
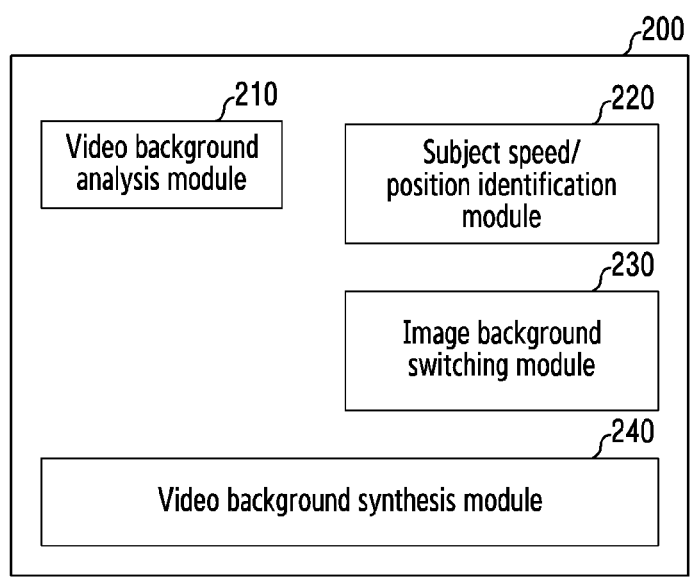
FIG. 2 is a block diagram illustrating an example configuration of a processor of the electronic device according to various embodiments.

FIG. 2 is a block diagram illustrating an example configuration of a processor 200 of the electronic device according to various embodiments. The description shown in FIG. 2 may be understood as software modules (e.g., including executable program instructions) implemented (e.g., executed) by the processor (e.g., including processing circuitry) 120 and/or implemented in the processor 120 of the electronic device 101 of FIG. 1. Contents described as being performed by the processor 200 of FIG. 2 may be understood as being implemented by the processor 120 of FIG. 1. In the description of FIG. 2, the elements and/or functions described with reference to FIG. 1 may be briefly described or omitted. In the following description, a pre-recorded background image may be referred to as a first background image, and a live background image included in a screen captured in real time may be referred to as a second background image.

Referring to FIG. 2, the electronic device 100 may use hardware and/or software modules to support functions for background synthesis. For example, the processor 200 may include various processing circuitry and drive, by executing instructions stored in the memory 130, a video background analysis module 210, a subject speed/position identification module 220, an image background switching module 230, and a video background synthesis module 240. In various embodiments, software modules other than those illustrated in FIG. 2 may be implemented. For example, at least two modules may be integrated into one module, or one module may be divided into two or more modules. In addition, work performance may be improved by hardware and software modules sharing a single function. For example, the electronic device 100 may include both of an encoder implemented as hardware and an encoder implemented as a software module, and a part of data acquired through at least one camera module may be processed by a hardware encoder, and the remaining part may be processed by a software encoder.

In an embodiment, the video background analysis module 210 may pre-capture a background image to be used for capturing a live video, and store the background image so as to use the same when recording a live video. For example, the video background analysis module 210 may acquire a first background image having a second field of view greater than a first field of view by image capturing while changing a direction toward which a camera included in the electronic device 101 faces, the camera having the first field of view. The first background image may refer to a background image that the electronic device 101 acquires in advance before capturing a live video. In addition, for example, the video background analysis module 210 may perform image capturing while changing a direction, toward which the camera included in the electronic device 101 faces, in a state where the camera is fixed in the vertical direction, and perform image capturing while changing a direction toward which the camera faces in a state where the camera is fixed in the horizontal direction, so as to acquire a background image (e.g., a first background image) for acquiring a part to be synthesized into a live video. In addition, for example, the video background analysis module 210 may acquire the first background image via a separate device that identifies movement of a subject and changes a direction of the camera. In addition, for example, the video background analysis module 210 may acquire a background image in advance by changing, via a prism or the like, a field of view of the camera and capturing an image while the electronic device 101 is fixed.

In an embodiment, the subject speed/position identification module 220 may identify movement of a subject image-captured by the camera of the electronic device 101 so as to identify a movement speed of the subject and a position of the subject. For example, the subject speed/position identification module 220 may acquire, using the camera included in the electronic device 101, a second background image corresponding to the first field of view that is a field of view of the camera and a subject located within the second background image. The second background image may refer to a background image acquired by the electronic device via a screen being captured live.

In an embodiment, the subject speed/position identification module 220 may identify a moving speed of the subject and synthesize, based on the moving speed, a first part of the pre-acquired first background image and a second part of the second background image that is currently being acquired.

In an embodiment, when the subject speed/position identification module 220 detects a movement of the subject, which is equal to or greater than a certain distance, the image background switching module 230 may switch the background image that is being captured live into the synthesized image obtained by synthesis, based on a speed corresponding to the moving speed of the subject.

In an embodiment, based on a distance between the subject and a designated position in the second background image that is being captured live via the camera of the electronic device 101, the video background synthesis module 240 may generate the synthesized image by synthesizing the first part of the first background image captured in advance and the second part of the second background image. For example, the first part may be acquired from the first background image, based on a first direction toward the subject from the designated position in the second background image and the distance between the subject and the designated position in the second background image; and the second part may be acquired from the second background image, based on a second direction that is opposite to the first direction and the distance between the subject and the designated position in the second background image, and a synthesized image may be generated by synthesizing the first part and the second part so that at least part of the first part and at least a part of the second part overlap.

Figure 3A:
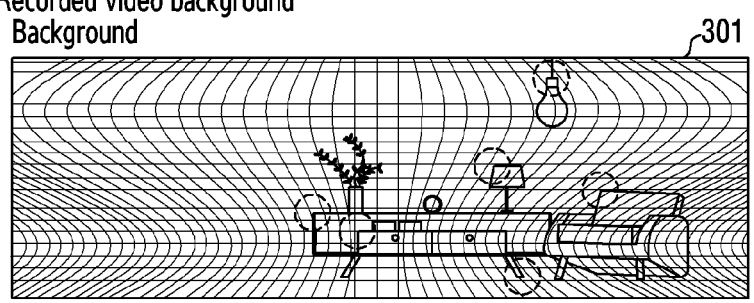
FIG. 3A is a diagram illustrating an example of a matching method according to various embodiments.
Figure 3A:
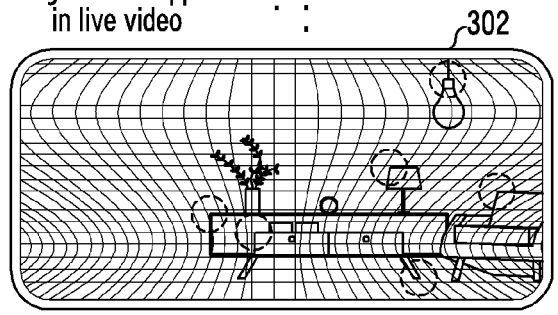
Figure 3B:
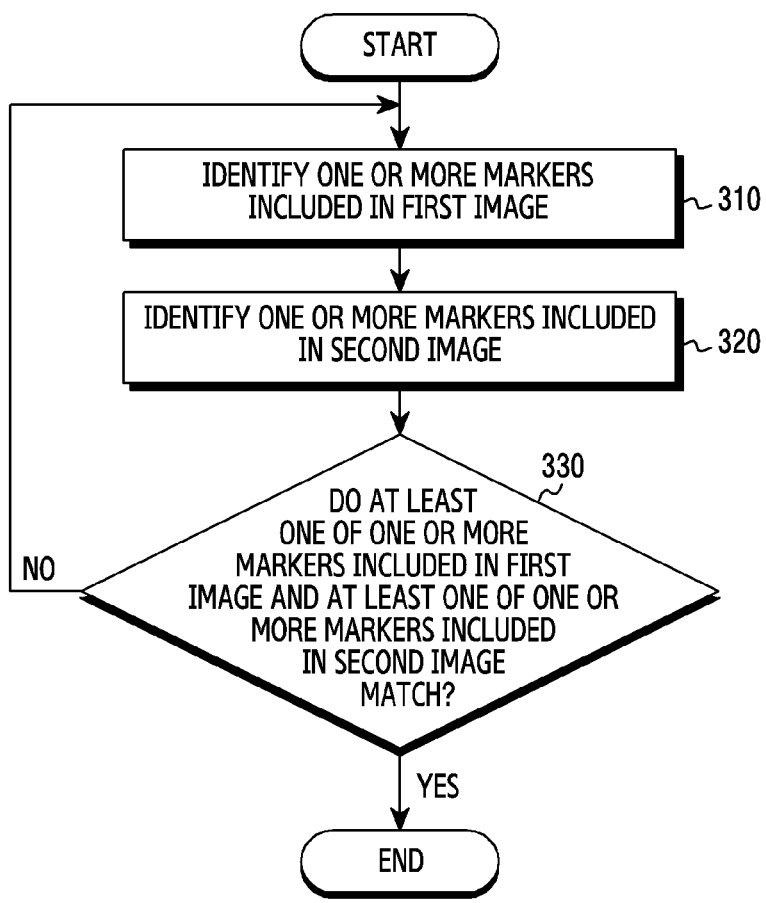
FIG. 3B is a flowchart illustrating an example matching operation of the electronic device according to various embodiments.

FIG. 3A is a diagram illustrating an example of a matching method according to various embodiments. FIG. 3B is a flowchart illustrating an example matching operation of the electronic device according to various embodiments.

For convenience of description below, a pre-recorded background image may be referred to as a first background image 301, and a live background image captured in real time may be referred to as a second background image 302.

In order to synthesize the first background image 301 and the second background image 302, the electronic device 101 may determine whether the first background image 301 and the second background image 302 match each other. The background images may include at least one marker. Comparing all pixels of the first background image 301 and the second background image 302 in order to determine whether the background images match requires a relatively large amount of resources, and may be thus inefficient. Accordingly, the electronic device 101 may configure, as markers, main points included in the images so as to determine whether the images match, based on the markers.

According to an embodiment, the electronic device 101 may determine whether the first background image 301 and the second background image 302 match, via a neural processing unit (NPU) included in the auxiliary processor 123 that is operable independently of or together with the processor 120.

According to an embodiment, in operation 310, the electronic device 101 may identify one or more markers included in the first background image 301.

According to an embodiment, in operation 320, the electronic device 101 may identify one or more markers included in the second background image.

In an embodiment, the processor 101 may identify (or define), as a marker, a part that is a feature of a main object included in a background image. For example, edges, borders, and tips of objects included in a recorded background image may be configured to be markers. Referring to FIG. 3A, markers may be configured on main objects (e.g., the corner of a desk, the corner of a desk lamp, the tip of a light bulb, the corner of a chair, and borders) included in the first background image 301 and the second background image 302.

In an embodiment, a marker may be configured at a preconfigured point within a background image by the electronic device 101 or a user of the electronic device 101.

According to an embodiment, in operation 330, the electronic device 101 may determine whether at least one of one or more markers included in the first background image 301 and at least one of one or more markers included in the second background image 302 match.

In an embodiment, when both the first background image 301 and the second background image 302 include a first marker, the electronic device 101 may determine that the first background image 301 and the second background image 302 match, and terminate matching.

In an embodiment, when the first marker included in the first background image 301 is not included in the second background image 302, the electronic device 101 may return to operation 310 to determine, using other markers included the two background images, whether the first background image 301 and the second background image 302 match.

Figure 4A:
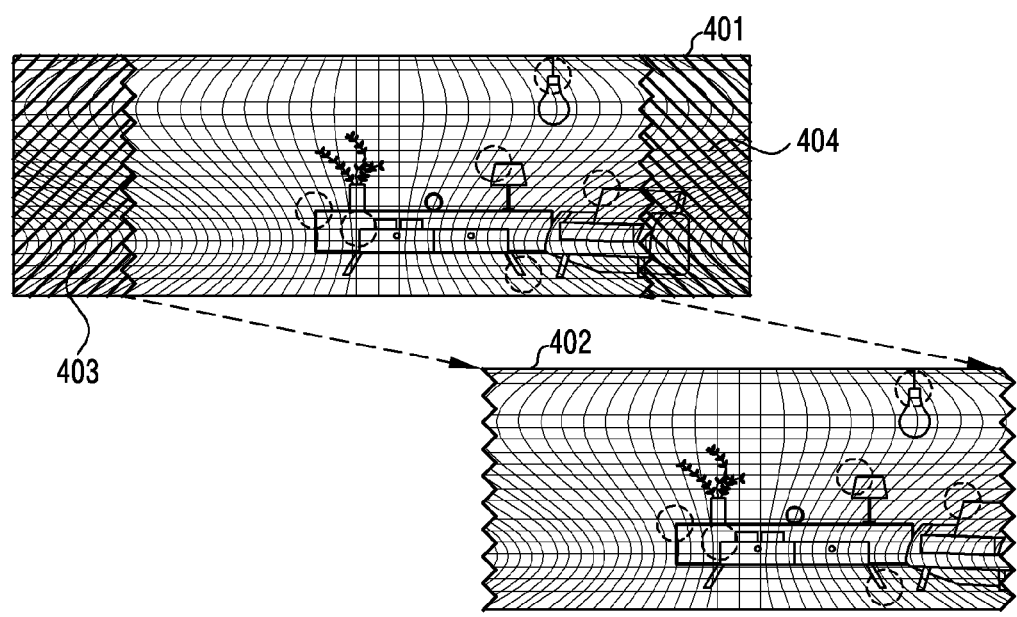
FIG. 4A is a diagram illustrating an example merging method according to various embodiments.
Figure 4B:
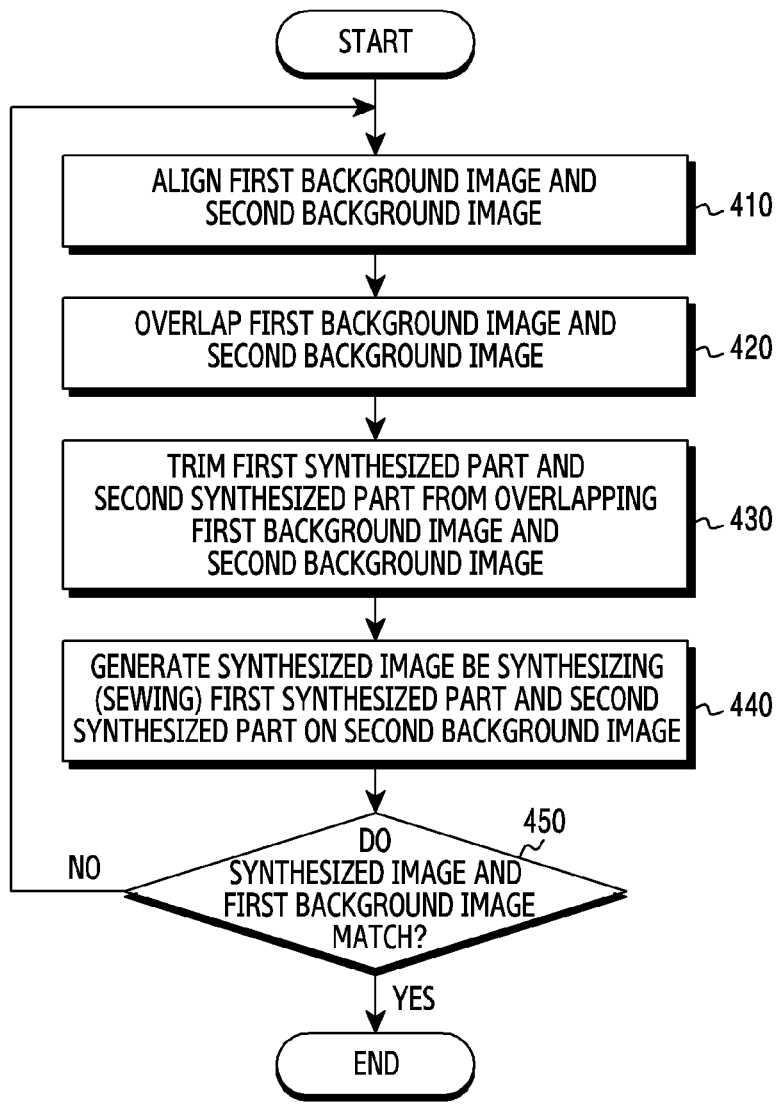
FIG. 4B is a flowchart illustrating an example merging operation of the electronic device according to various embodiments.

FIG. 4A is a diagram illustrating an example of a merging method according to various embodiments. FIG. 4B is a flowchart illustrating an example merging operation of the electronic device according to various embodiments. The electronic device described in FIG. 4A and FIG. 4B may include the electronic device 101 of FIG. 1. For convenience of description below, a pre-recorded background image may be referred to as a first background image 401, and a live background image captured in real time may be referred to as a second background image 402.

When it is identified, via matching, that the first background image 401 and the second background image 402 match, the electronic device 101 may merge the first background image 401 and the second background image 402.

According to an embodiment, in operation 410, the electronic device 101 may align the first background image 401 and the second background image 402.

In an embodiment, the electronic device 101 may determine the first background image 401 and the second background image 402 which are to be synthesized, and then may align the first background image 401 and the second background image 402. Referring to FIG. 4A, it may be seen that the first background image 401 is aligned with the second background image 402 (illustrated by a dotted arrow).

In an embodiment, the electronic device 101 may align the first background image 401 and the second background image 402, based on a marker included in both the first background image 401 and the second background image 402. The electronic device 101 may convert, into coordinate values, positions of the markers included in both the first background image 401 and the second background image 402, so as to align the first background image 401 and the second background image 402, based on the coordinate values.

According to an embodiment, in operation 420, the electronic device 101 may overlap the first background image 401 and the second background image 402.

In an embodiment, the electronic device 101 may overlap the first background image 401 as an upper layer and the second background image 402 as a lower layer. The electronic device 101 may overlap the first background image 401 as a lower layer and the second background image 402 as an upper layer.

According to an embodiment, in operation 430, the electronic device 101 may trim a first synthesized part and a second synthesized part from the overlapping first background image 401 and second background image 402. The first synthesized part 403 and the second synthesized part 404 may refer to non-overlapping parts after the first background image 401 and the second background image 402 are aligned and overlapped. The synthesized parts may include the first synthesized part 403 located in a first direction of the second background image 402 and the second synthesized part 404 located in a second direction of the second background image 402. The second direction may refer to a direction opposite to the first direction.

According to an embodiment, in operation 440, the electronic device 101 may generate a synthesized image by synthesizing (e.g., sewing) the first synthesized part 403 and the second synthesized part 404 on the second background image 402.

In an embodiment, the electronic device 101 may perform sewing so that the first synthesized part 403 meets the first direction of the second background image 402, and the second synthesized part 404 meets the second direction of the second background image 402. Although only the first direction (e.g., left) and the second direction (e.g., right) are illustrated in the drawing, the electronic device 101 may also sew the synthesized parts on the upper or lower direction of the second background image 402.

According to an embodiment, in operation 450, the electronic device 101 may identify whether the synthesized image and the first background image 401 match. This may be understood so that the matching illustrated in FIG. 3A and FIG. 3B is performed with respect to the synthesized image and the first background image 401.

In an embodiment, the electronic device 101 may determine whether at least one of one or more markers included in the synthesized image and at least one of one or more markers included in the first background image 401 match.

In an embodiment, when the electronic device 101 determines that the synthesized image and the first background image 401 match, the electronic device 101 may terminate synthesizing.

In an embodiment, when the electronic device 101 determines that the synthesized image and the first background image 401 do not match, the electronic device 101 may return to operation 410 to perform synthesis again.

Figure 5:
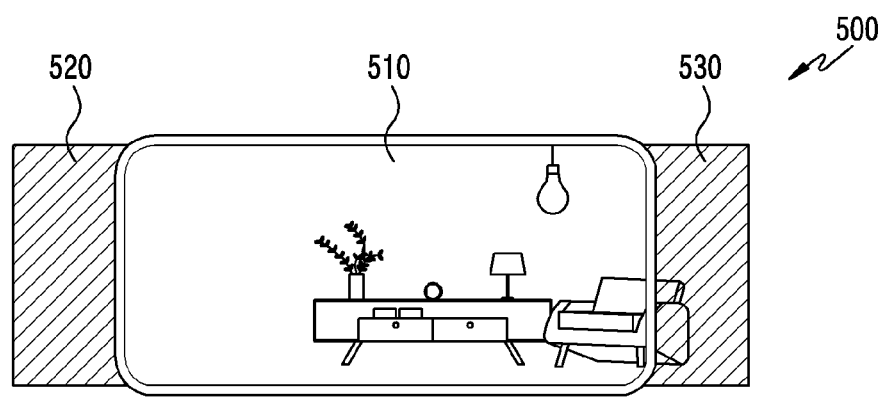
FIG. 5 is a diagram illustrating an example of a synthesized background according to various embodiments.

FIG. 5 is a diagram illustrating an example of a synthesized background according to various embodiments. Referring to FIG. 5, a first background image captured in advance and a second background image that is currently being captured and corresponds to a first field of view are illustrated.

In an embodiment, if a subject is in the center of the second background image 510, the electronic device 101 may not perform background synthesis.

In an embodiment, when the subject moves in a first direction (e.g., to the left) of the second background image 510, the subject is not located in the center of a screen that is currently being captured via the first field of view, and therefore the electronic device 101 may synthesize a first synthesized part 520 and a part of the second background image 510.

In an embodiment, when the subject moves in a second direction (e.g., to the right) of the second background image 510 (e.g., toward the sofa on the right), the subject is not located in the center of the screen that is currently being captured via the first field of view, and therefore the electronic device 101 may synthesize a second synthesized part 530 and a part of the second background image 510.

A method of determining a synthesized part (e.g., the first synthesized part 520 or the second synthesized part 530) to be sewed on a screen that is currently being captured is described in greater detail below with reference to FIG. 6.

Figure 6:
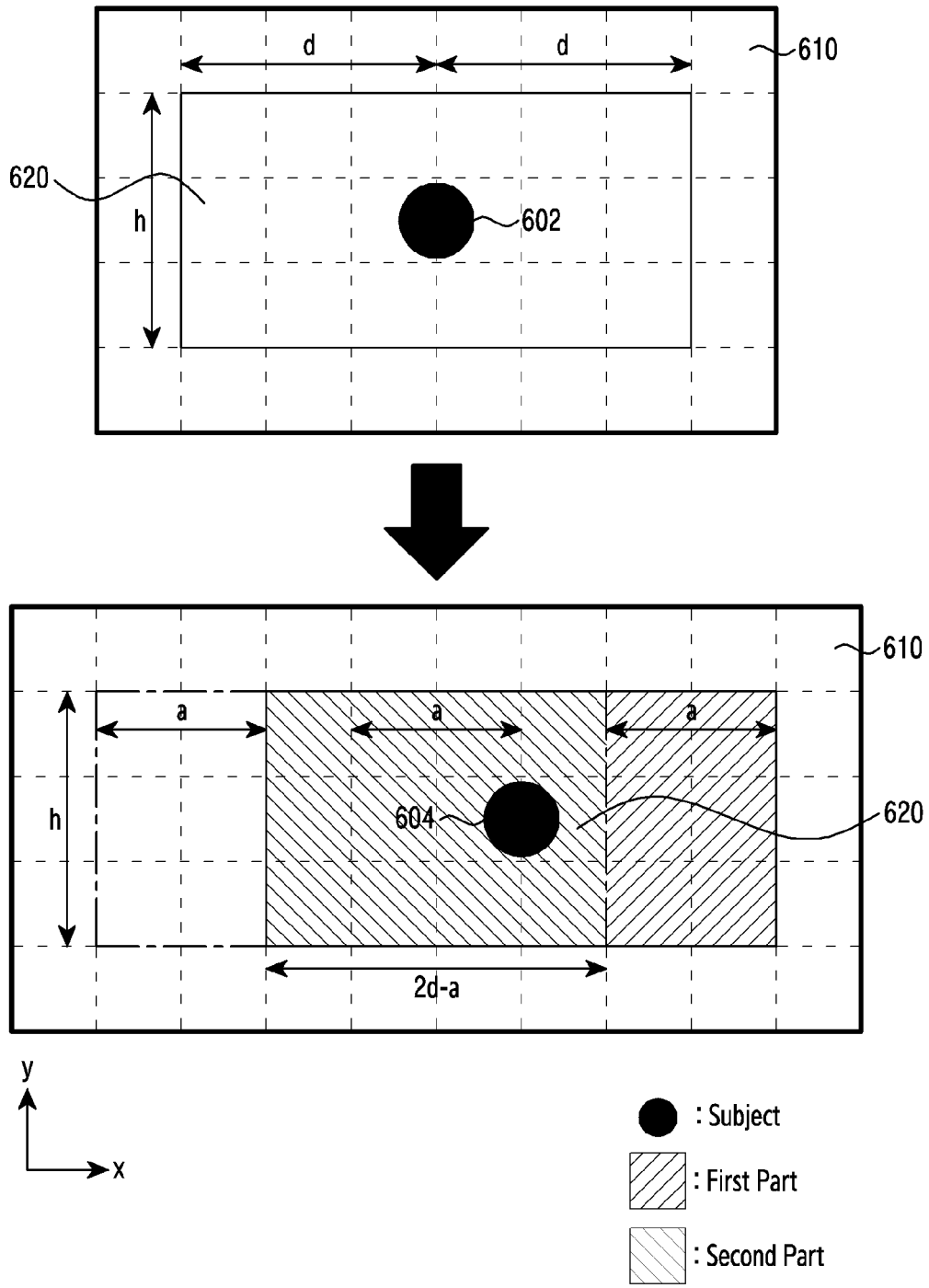
FIG. 6 is a diagram illustrating an example method of determining a synthesized part by the electronic device according to various embodiments.

FIG. 6 is a diagram illustrating an example method of determining a synthesized part by the electronic device according to various embodiments. In providing a live streaming service, a video captured by the electronic device 101 may include a background image and a subject. A background image may refer to a static background included in a video to be captured. A size of a background image may vary according to a field of view of a camera included in the electronic device 101, a resolution of a screen, lens specifications, and the like. A subject may refer to an object moving within a background image. For example, a subject may include a dynamically moving object within a live background image, such as a person, an animal, or the electronic device 101.

In a case where the electronic device 101 captures a live video, a subject is able to move dynamically, while a position in a background image is constant without a change unless there are special circumstances, such as the subject moves a static object included in the background image, so that a position of the subject within the background image may be changed. In this regard, there may be a case where the subject moves in one direction, in which case, the subject moves away from the center of a live background image currently being captured, and is thus shifted to one side of a screen, so that a viewer's sense of immersion while watching the live video may be reduced. Since the viewer watches the live video on the basis of the subject, it is important that the subject is at the center of the screen currently being captured.

In an embodiment, there may be a method of, in order to locate the subject at the center of a frame of the live video, manually moving the camera following the subject by an image-capturing subject or including a separate device for identifying movement of the subject so as to change a direction of the camera. In addition, the electronic device 101 may identify an area where the subject is located and synthesize the area with a pre-recorded background. However, since this is a method performed by identifying a constantly moving subject, a lot of resources are required for synthesis, and there is a problem that a quality of a synthesized image is limited when the movement of the subject is large or fast. In embodiments of the disclosure, apart from a subject, a high-quality synthesized image may be generated by synthesizing a previously captured background image and a background image included in a currently captured video.

Hereinafter, an example of a method for determining a part to be synthesized in a pre-recorded background image will be described in greater detail with reference to FIG. 6. In the following description, for convenience, a pre-recorded background image is referred to as a first background image 610 and a background image that is being captured live is referred to as a second background image 620. The scope of the disclosure may include a case where a subject moves in the y-axis direction.

Referring to FIG. 6, an image currently being captured may include a subject and the second background image 620. A height of the second background image 620 may be h and a width thereof may be 2d. The subject may be located at a first position 602 of the second background image 620. The first position 602 may refer to the center of the second background image 620. Later, during live image capturing, the subject may move in a first direction from the first position 602 by a first length a, so as to be located at a second position 604. As the subject is located at the second position 604, the subject is not at the center of the second background image 620, but is shifted in the first direction by the first length a, and therefore the electronic device 101 may generate an image so that the subject is located at the center of the second background image 620. In order to place the subject at the center of the second background image 620, the electronic device 101 may need to determine a first part of the first background image 610 and a second part of the second background image 620 so as to generate a synthesized image including the first part and the second part. The first part may include a part of the previously captured first background image 610, which is synthesized to the second background image 620 that is a current live background image. The second part may refer to a part of the second background image 620, which is included in the synthesized image.

In an embodiment, the first part of the first background image 610 may be acquired from the first background image 610, based on a moving distance of the subject (first length a) and a moving direction (e.g., first direction) of the subject. For example, referring to FIG. 6, the first part may be located in the first direction of the second background image 620, and may be acquired from the first background image 610 so that an area corresponding to a in the first direction is included at the end of the second background image 620 in the first direction.

In an embodiment, the second part of the second background image 620 may be acquired from a part of the second background image 620, based on a moving distance a of the subject, a moving direction (the first direction) of the subject, and a size (e.g., the width of 2d) of the second background image 620. For example, referring to FIG. 6, the second part may be acquired from the second background image 620 so that, in the second background image 620, an area corresponding to 2d−a in the second direction is included at the end of the second background image 620 in the first direction.

Figure 7:
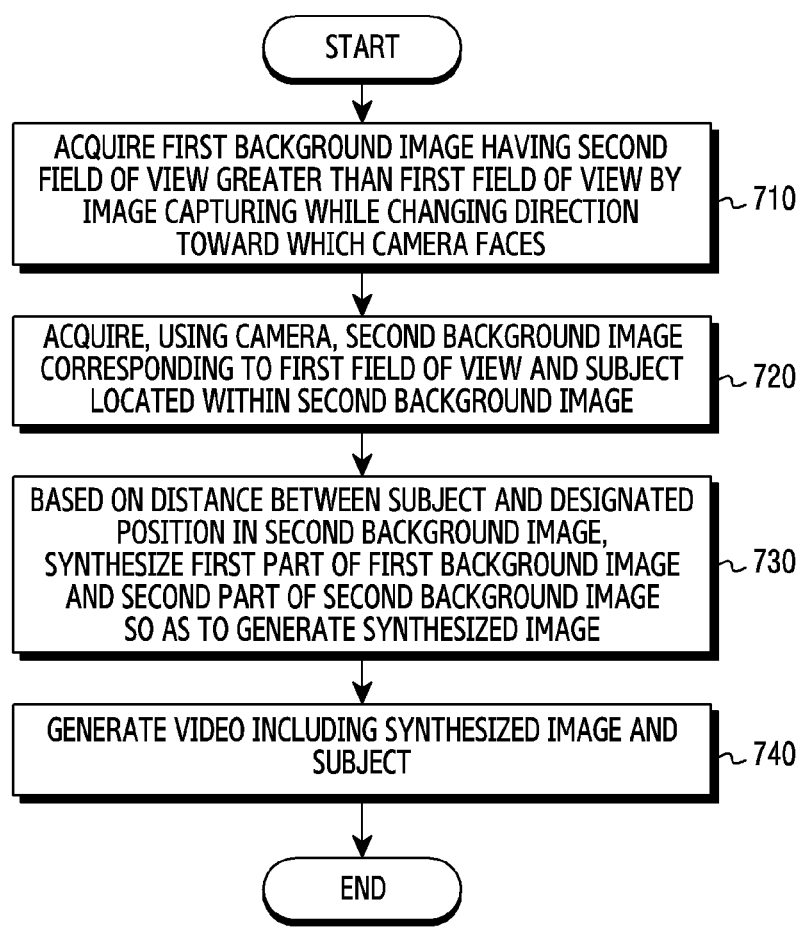
FIG. 7 is a flowchart illustrating an example operation of generating a video including a synthesized image and a subject by the electronic device according to various embodiments.

FIG. 7 is a flowchart illustrating an example operation of generating a video including a synthesized image and a subject by the electronic device according to various embodiments. The electronic device illustrated in FIG. 7 may include the electronic device 101 of FIG. 1. In the following description, a first background image may refer to a background image that the electronic device 101 acquires in advance by image capturing before capturing a live video. A second background image may refer to a background image acquired when a live video is captured.

According to an embodiment, in operation 710, the electronic device 101 may acquire a first background image having a second field of view greater than a first field of view by image capturing while changing a direction toward which a camera faces. In order for the electronic device 101 to synthesize a previously captured background screen with a live video, it is necessary to capture, in advance, the first background image to be synthesized with the live video. The first field of view may refer to a field of view of the camera included in the electronic device 101, and the second field of view may refer to a field of view of the first background image acquired before capturing the live video via the first field of view.

In an embodiment, the first background image may have the second field of view greater (e.g., twice the first field of view) than the first field of view of the live background image.

In an embodiment, the second field of view may be determined based on at least one of a field of view supportable by the camera included in the electronic device 101, specifications of a lens, a focal length, and a resolution.

In an embodiment, the electronic device 101 may acquire the first background image, based on an image captured with the fixed vertical direction of the camera and an image captured with the fixed horizontal direction of the camera.

According to an embodiment, in operation 720, the electronic device 101 may acquire, using the camera, a second background image corresponding to the first field of view and a subject located in the second background image.

In an embodiment, the second background image may be acquired based on at least one of the first field of view, a resolution of the live video, and a focal length.

In an embodiment, the subject may include a moving object located in the second background image. For example, the subject may include a person, an animal, and an object moved by a person and an animal.

According to an embodiment, in operation 730, the electronic device 101 generate a synthesized image by synthesizing a first part of the first background image and a second part of the second background image, based on a distance between the subject and a designated position in the second background image.

During live video capturing, there may be a case where the subject moves from the designated position so as to deviate from the center of the second background image. In this way, when the subject moves away from the center of the second background image and is shifted to one side, the subject is not located in the center of a screen, so that a viewer's sense of immersion may be reduced. Therefore, in order to generate the video so that the subject is located at the center of the screen, the electronic device 101 may need to acquire a part of the previously captured background screen and synthesize the same with the live video. As a part to be synthesized with the live background image, a part acquired from the previously captured background screen may be referred to as the first part, and as a part to be synthesized with the first part, a part that is a part of the second background image may be referred to as the second part.

In an embodiment, a position in the second background image may include a position corresponding to the center of the live video. For example, when the video is generated based on the entire image acquired via the first field of view, since the position corresponding to the center of the live video is a position corresponding to the first field of view, the designated position in the second background image may correspond to the center of the first field of view. In addition, for example, when the video is generated based on only a part of the image acquired via the first field of view, a position corresponding to the center of the first field of view may not be the center of the live video, so that, in this case, the designated position in the second background image may correspond to the center of the second background image.

In an embodiment, the distance between the subject and the designated position in the second background image may be calculated based on at least one of a center of gravity of an area including the subject and a specific part (face or body part) of the subject.

In an embodiment, the first part of the first background image may be acquired from the previously captured first background image, based on a distance and a direction in which the subject deviates from the designated position in the second background image. For example, the first part may be acquired from the first background image, based on a first direction toward the subject from the designated position in the second background image and the distance between the subject and the designated position in the second background image. For example, the first part may be located in the first direction of the second background image, and may be acquired from the first background image so that an area corresponding to the moving distance in the first direction is included at the end of the second background image in the first direction.

In an embodiment, the second part of the second background image may be acquired from the second background image, based on the distance and direction in which the subject deviates from the designated position in the second background image. For example, the second part may be acquired from the second background image, based on a second direction opposite to the first direction that is the moving direction of the subject and the distance between the subject and the designated position in the second background image. Specifically, the second part may be acquired from the second background image so that, in the second background image, an area corresponding to the moving distance in the second direction is included at the end of the second background image in the first direction.

In an embodiment, in order to synthesize the recorded background image and the live background image, the electronic device 101 may perform matching and merging. Matching may be understood as determining whether two images to be synthesized match. The determining of whether the two images match by the electronic device 101 may include determining, by the electronic device 101, whether the recorded background image and the live background image, which are to be synthesized, at least partially match. In an embodiment, merging may include overlapping the recorded background image and the live background image which are to be synthesized, and trimming and sewing unnecessary parts, by the electronic device 101.

In an embodiment, a synthesized image may be generated by synthesizing the first part and the second part. The first part and the second part may be synthesized according to the matching and merging described above with reference to FIG. 3A, FIG. 3B, FIG. 4A, and FIG. 4B. For example, the electronic device 101 may align the first part and the second part, based on one or more markers included in the first part and one or more markers included in the second part. Then, the electronic device 101 may overlap the first part and the second part. Then, the electronic device 101 may trim a first synthesized part and a second synthesized part from the overlapping first and second background images. Then, the electronic device 101 may generate the synthesized image by synthesizing (sewing) the first synthesized part and the second synthesized part on the second background image. Then, the electronic device 101 may determine whether the generated synthesized image and the first background image match.

According to an embodiment, in operation 740, the electronic device 101 may generate a video comprising the synthesized image and the subject.

In an embodiment, the electronic device 101 may display the generated video via the display of the electronic device 101.

In an embodiment, the electronic device 101 may transmit the generated video to a streaming server. The streaming server may include a device capable of transmitting a live video to external electronic devices used by at least one viewer watching a live broadcast.

Figure 8:
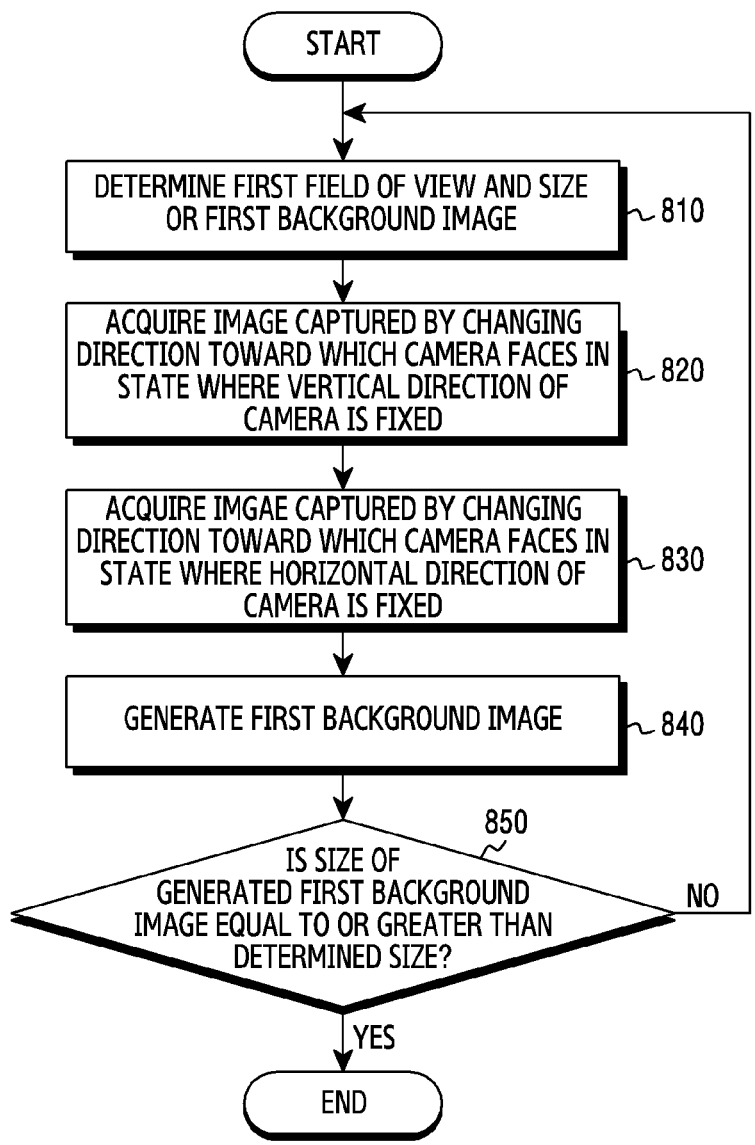
FIG. 8 is a flowchart illustrating an example operation of acquiring a background image by the electronic device according to various embodiments.

FIG. 8 is a flowchart illustrating an example operation of acquiring a background image by the electronic device according to various embodiments. The electronic device of FIG. 8 may include the electronic device 101 of FIG. 1.

According to an embodiment, in operation 810, the electronic device 101 may determine a first field of view and a size of a first background image. The first field of view may refer to a field of view of a camera included in the electronic device 101. A size of the first background image may include information on a width and a height of the first background image.

In an embodiment, the electronic device 101 may calculate the size of the first background image, based on the first field of view and a focal length. For example, the electronic device 101 may determine the size of the first background image by calculating, using the first field of view and the focal length, a width and a height corresponding to n times of a resolution of a currently captured screen. n may refer to a positive number of 1 or greater.

According to an embodiment, in operation 820, the electronic device 101 may acquire an image captured while changing a direction, toward which the camera faces, in a state where the vertical direction of the camera is fixed. In operation 830, the electronic device 101 may acquire an image captured while changing a direction, toward which the camera faces, in a state where the horizontal direction of the camera is fixed.

In an embodiment, in operation 820 and operation 830, the image capturing while changing the direction, toward which the camera faces, in a state where the vertical or horizontal direction of the camera is fixed may be performed via a user interface (UI). For example, the user interface may include an object associated with a user input for executing a function of changing the direction toward which the camera faces. When a user input is received via an object associated with a user input for executing a function of changing the direction toward which the camera faces, the electronic device 101 may perform image capturing by changing the direction, toward which the camera faces, in a state where the vertical or horizontal direction of the camera is fixed.

According to an embodiment, in operation 820, the electronic device 101 may move a horizontal angle of the camera while the vertical direction of the camera is fixed, thereby acquiring images of an angle corresponding to 1.5 times to the left and 1.5 times to the right. In an embodiment, in operation 830, the electronic device 101 may move a vertical angle of the camera while the horizontal direction of the camera is fixed, thereby acquiring images of an angle corresponding to 1.5 times upward and 1.5 times downward.

According to an embodiment, in operation 840, the electronic device 101 may generate the first background image, based on the images captured while changing the direction in a state where the vertical direction of the camera is fixed and the images captured in a state where the horizontal direction of the camera is fixed.

According to an embodiment, in operation 850, the electronic device 101 may determine whether the size of the generated first background image is greater than or equal to the determined size.

According to an embodiment, if the size of the first background image generated in operation 840 is greater than or equal to the size of the first background image determined in operation 810, the electronic device 101 may terminate acquiring of the first background image and store the first background image.

According to an embodiment, if the size of the first background image generated in operation 840 is smaller or less than the size of the first background image determined in operation 810, the electronic device 101 may return to operation 820 and perform operations again.

Figure 9:
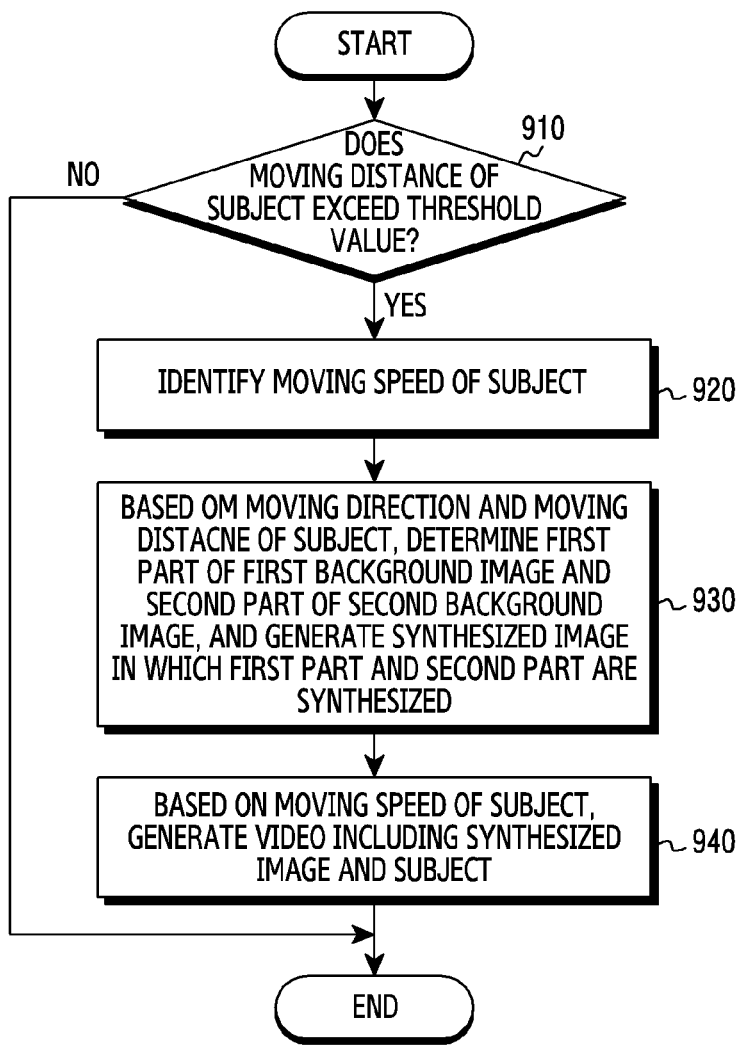
FIG. 9 is a flowchart illustrating an example operation of switching a background by the electronic device according to various embodiments.

FIG. 9 is a flowchart illustrating an example operation of switching a background by the electronic device according to various embodiments. The electronic device of FIG. 9 may include the electronic device 101 of FIG. 1. The operation according to FIG. 9 may include the operation of the electronic device 101 illustrated in FIG. 7. The first background image and the second background image described in FIG. 9 may be understood as concepts corresponding to the first background image and the second background image described in FIG. 7. The first part and the second part described in FIG. 9 may be understood as concepts corresponding to the first part and the second part described in FIG. 7. The synthesized image described in FIG. 9 may be understood as a concept corresponding to the synthesized image described in FIG. 7.

According to an embodiment, in operation 910, the electronic device 101 may determine whether a moving distance of a subject exceeds a threshold value. The moving distance of the subject may refer to a distance the subject moves from the center of a live background image during live video capturing. The moving distance of the subject may refer to a distance between the subject and a designated position in the first background image.

In an embodiment, if the moving distance of the subject does not exceed the threshold value, the electronic device 101 may terminate background synthesis. If the moving distance of the subject is equal to or less than a certain value, the electronic device 101 may determine that the subject is still located in the center of the first background image, and may not perform background synthesis.

In an embodiment, if the moving distance of the subject exceeds the threshold value, the electronic device 101 may identify a moving speed of the subject in operation 920. The moving speed of the subject may be a value obtained by measuring the moving distance of the subject over time.

According to an embodiment, in operation 930, the electronic device 101 may determine a first part of the first background image and a second part of a second background image, based on the moving distance and moving direction of the subject, and generate a synthesized image in which the first part and the second part are synthesized. The operation of the electronic device 101 according to operation 930 may include the method of determining a synthesis area illustrated in FIG. 6 and operations 730 and 740 of FIG. 7.

According to an embodiment, in operation 940, the electronic device 101 may generate a video including the synthesized image and the subject, based on the moving speed of the subject. In order to prevent and/or reduce a viewer's sense of immersion from being reduced, the electronic device 101 needs to switch the background according to the moving speed of the subject. The electronic device 101 may generate a video including the synthesized image and the subject generated to correspond to the moving speed of the subject. For example, if the subject moves quickly, video synthesis may be performed quickly, and if the subject moves slowly, video synthesis may also be performed slowly. The operation illustrated in FIG. 9 may be understood as an operation that continuously occurs every time movement of the subject is identified.

Figure 10:
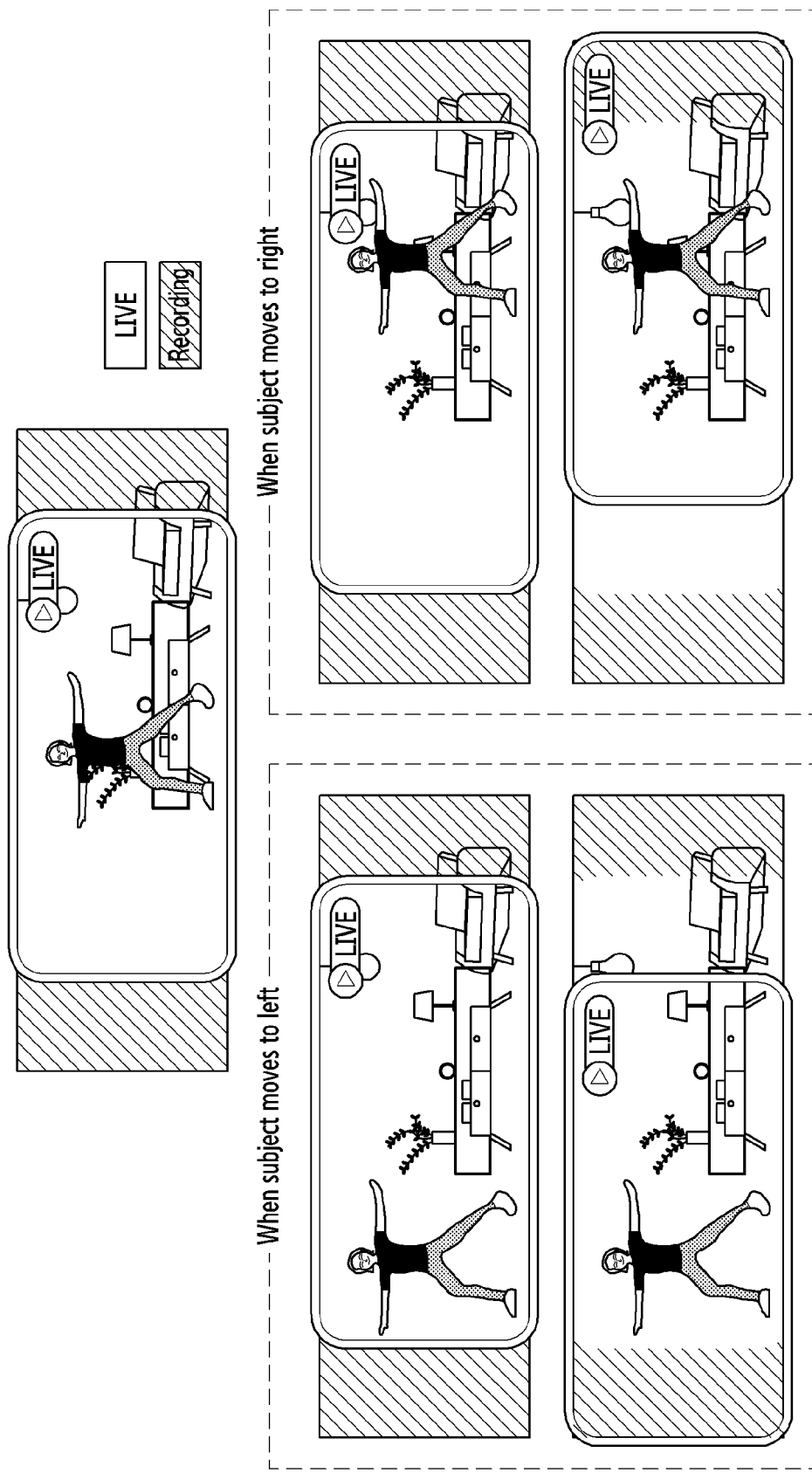
FIG. 10 is a diagram illustrating an example of a synthesized background according to various embodiments.

FIG. 10 is a diagram illustrating an example of a synthesized background according to various embodiments.

Referring to FIG. 10, examples of a case where a subject moves to the left and moves to the right are illustrated. The scope of rights according to the disclosure may be equally applied even when the subject moves upward, downward, and obliquely.

In an embodiment, when the subject moves to the left, a part of a first background image previously captured before broadcasting starts is trimmed, and the trimmed part is synthesized with an image being captured, so that a synthesized image is generated. In this case, not the entire synthesized image is switched to a background, and the background may be switched at a speed corresponding to an actual moving speed of a camera according to a moving speed of the subject. In an embodiment, when the subject moves to the right, an operation corresponding to the aforementioned operation may also be performed to switch the background.

An electronic device according to an example embodiment of the disclosure may include: a camera having a first field of view, and at least one processor operably connected to the camera, wherein the at least one processor is configured to: acquire a first background image having a second field of view greater than the first field of view by image capturing while changing a direction toward which the camera faces, acquire, using the camera, a second background image corresponding to the first field of view and a subject located within the second background image, generate a synthesized image by synthesizing a first part of the first background image and a second part of the second background image, based on a distance between the subject and a designated position in the second background image, and generate a video including the synthesized image and the subject.

In an example embodiment, the at least one processor may be configured to: acquire the first part from the first background image, based on a first direction toward the subject from the designated position in the second background image and the distance between the subject and the designated position in the second background image, and may acquire the second part from the second background image, based on a second direction opposite to the first direction and the distance between the subject and the designated position in the second background image, wherein at least part of the first part and at least a part of the second part overlap.

In an example embodiment, the designated position may correspond to the center of the first field of view. In an example embodiment, the designated position may correspond to the center of the second background image.

In an example embodiment, the at least one processor may be configured to: identify one or more first markers included in the first part and one or more second markers included in the second part, and synthesize the first part and the second part in response to at least one of the one or more first markers being matched to at least one of the one or more second markers.

In an example embodiment, the at least one processor may be configured to: identify a moving speed of the subject, and synthesize the first part and the second part, based on the moving speed, wherein the subject is formed at a designated position in the synthesized image.

In an example embodiment, the at least one processor may be configured to acquire the first background image by image capturing while changing a direction toward which the camera faces in a state where the camera is fixed in the vertical direction, and image capturing while changing a direction toward which the camera faces in a state where the camera is fixed in the horizontal direction.

In an example embodiment, the distance between the subject and the designated position in the second background image may be acquired based on at least one of a position of a center of gravity of the subject and a position corresponding to the subject's face.

In an embodiment, the at least one processor may be configured to: synthesize the first part of the first background image and the second part of the second background image if the distance between the subject and the designated position in the second background image is equal to or greater than a threshold value. In an example embodiment, the electronic device may further include a display, and the at least one processor may be configured to display, on the display, the generated video including the synthesized image and the subject.

In an example embodiment, the electronic device may further include a communication circuit, and the at least one processor may be configured to transmit the generated video including the synthesized image and the subject to a streaming server via the communication circuit.

An example method of operating an electronic device according to an example embodiment of the disclosure may include: acquiring a first background image having a second field of view greater than a first field of view by image capturing while changing a direction toward which a camera having the first field of view faces, acquiring a second background image corresponding to the first field of view and a subject located within the second background image, generating a synthesized image by synthesizing a first part of the first background image and a second part of the second background image, based on a distance between the subject and a designated position in the second background image, and generating a video including the synthesized image and the subject.

In an example embodiment, the generating of the synthesized image may include: acquiring the first part from the first background image, based on a first direction toward the subject from the designated position in the second background image and the distance between the subject and the designated position in the second background image, acquiring the second part from the second background image, based on a second direction that is opposite to the first direction and the distance between the subject and the designated position in the second background image, and synthesizing the first part and the second part so that at least a part of the first part and at least a part of the second part overlap. In an example embodiment, the generating of the synthesized image may include identifying one or more first markers included in the first part and one or more second markers included in the second part, and synthesizing the first part and the second part in response to at least one of the one or more first markers being matched to at least one of the one or more second markers.

In an example embodiment, the synthesizing of the first part and the second part may include trimming an area excluding the first part and the second part from the synthesized image so as to correspond to a size of the second background image.

In an example embodiment, the acquiring of the first background image may include performing image capturing while changing a direction toward which the camera faces in a state where the camera is fixed in the vertical direction, and image capturing while changing a direction toward which the camera faces in a state where the camera is fixed in the horizontal direction, so as to acquire the first background image.

In an example embodiment, the method may further include: displaying the generated video including the synthesized image and the subject.

In an example embodiment, the method may further include transmitting the generated video including the synthesized image and the subject to a streaming server.

In an example embodiment, the generating of the synthesized may include: identifying that the distance between the subject and the designated position in the second background image is equal to or greater than a threshold value, identifying a moving speed of the subject, and synthesizing the first part and the second part, based on the moving speed of the subject.

In a non-transitory computer-readable recording medium storing computer-readable instructions according to an example embodiment of the disclosure, the instructions may, when executed by at least one processor of an electronic device, cause the electronic device to perform at least one operation comprising: acquisition of a first background image having a second field of view greater than a first field of view by image capturing while changing a direction toward which a camera of the electronic device faces, the camera having the first field of view, acquisition of a second background image corresponding to the first field of view and a subject located within the second background image, generation of a synthesized image by synthesizing a first part of the first background image and a second part of the second background image, based on a distance between the subject and a designated position in the second background image, and generation of a video including the synthesized image and the subject.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a camera having a first field of view; and
at least one processor operably connected to the camera, wherein the at least one processor is configured to:
acquire a first background image having a second field of view greater than the first field of view by image capturing while changing a direction toward which the camera faces;
acquire, using the camera, a second background image corresponding to the first field of view and a subject located within the second background image;
based on a distance between the subject and a designated position in the second background image, generate a synthesized image by synthesizing a first part of the first background image and a second part of the second background image; and
generate a video comprising the synthesized image and the subject.

2. The electronic device of claim 1, wherein the at least one processor is configured to:
acquire the first part from the first background image, based on a first direction toward the subject from the designated position in the second background image and the distance between the subject and the designated position in the second background image; and
acquire the second part from the second background image, based on a second direction opposite to the first direction and the distance between the subject and the designated position in the second background image, and
wherein at least part of the first part and at least a part of the second part overlap.

3. The electronic device of claim 1, wherein the designated position corresponds to the center of the first field of view.

4. The electronic device of claim 1, wherein the designated position corresponds to the center of the second background image.

5. The electronic device of claim 1, wherein the at least one processor is configured to:
identify one or more first markers included in the first part and one or more second markers included in the second part; and
synthesize the first part and the second part in response to at least one of the one or more first markers matching at least one of the one or more second markers.

6. The electronic device of claim 1, wherein the at least one processor is configured to:
identify a moving speed of the subject; and
based on the moving speed, synthesize the first part and the second part, and wherein the subject is placed at a designated position in the synthesized image.

7. The electronic device of claim 1, wherein the at least one processor is configured to: acquire the first background image by image capturing while changing a direction toward which the camera faces in a state where the camera is fixed in the vertical direction, and image capturing while changing a direction toward which the camera faces in a state where the camera is fixed in the horizontal direction.

8. The electronic device of claim 1, wherein the distance between the subject and the designated position in the second background image is acquired based on at least one of a position of a center of gravity of the subject and a position corresponding to the subject's face.

9. The electronic device of claim 1, wherein the at least one processor is configured to: synthesize the first part of the first background image and the second part of the second background image based on the distance between the subject and the designated position in the second background image being equal to or greater than a threshold value.

10. The electronic device of claim 1, further comprising a display, wherein the at least one processor is configured to display, on the display, the generated video comprising the synthesized image and the subject.

11. The electronic device of claim 1, further comprising a communication circuit, wherein the at least one processor is configured to transmit the generated video comprising the synthesized image and the subject to a streaming server via the communication circuit.

12. A method of operating an electronic device, the method comprising:
acquiring a first background image having a second field of view greater than a first field of view by image capturing while changing a direction toward which a camera having the first field of view faces;
acquiring a second background image corresponding to the first field of view and a subject located within the second background image;
based on a distance between the subject and a designated position in the second background image, generating a synthesized image by synthesizing a first part of the first background image and a second part of the second background image; and
generating a video comprising the synthesized image and the subject.

13. The method of claim 12, wherein the generating of the synthesized image comprises:
acquiring the first part from the first background image, based on a first direction toward the subject from the designated position in the second background image and the distance between the subject and the designated position in the second background image;
acquiring the second part from the second background image, based on a second direction opposite to the first direction and the distance between the subject and the designated position in the second background image; and
synthesizing the first part and the second part so that at least a part of the first part and at least a part of the second part overlap.

14. The method of claim 12, wherein the generating of the synthesized image comprises:
identifying one or more first markers included in the first part and one or more second markers included in the second part; and
synthesizing the first part and the second part in response to at least one of the one or more first markers matching at least one of the one or more second markers.

15. The method of claim 14, wherein the synthesizing of the first part and the second part comprises trimming an area excluding the first part and the second part from the synthesized image to correspond to a size of the second background image.

16. The method of claim 12, wherein the acquiring the first background image comprises:
image capturing while changing a direction toward which the camera faces in a state where the camera is fixed in the vertical direction; and
acquiring the first background image by image capturing while changing a direction toward which the camera faces in a state where the camera is fixed in the horizontal direction.

17. The method of claim 12, further comprises:
displaying the generated video comprising the synthesized image and the subject.

18. The method of claim 12, further comprises:
transmitting the generated video comprising the synthesized image and the subject to a streaming server.

19. The method of claim 12, wherein the generating of the synthesized image comprises:
identifying that the distance between the subject and the designated position in the second background image is equal to or greater than a threshold value;
identifying a moving speed of the subject; and
synthesizing the first part of the first background image and the second part of the second background image based on the moving speed.

20. A non-transitory computer-readable recording medium that stores instructions which, when executed by at least one processor, cause the at least one processor to perform operations comprising:
acquiring a first background image having a second field of view greater than a first field of view by image capturing while changing a direction toward which a camera having the first field of view faces;
acquiring a second background image corresponding to the first field of view and a subject located within the second background image;
based on a distance between the subject and a designated position in the second background image, generating a synthesized image by synthesizing a first part of the first background image and a second part of the second background image; and
generating a video comprising the synthesized image and the subject.

* * * * *